Oct. 27, 1931.  G. G. FREYGANG  1,828,894
SUPERVISORY SYSTEM FOR DETECTING SUSPENDED MATTER IN FLUIDS
Filed Oct. 30, 1928
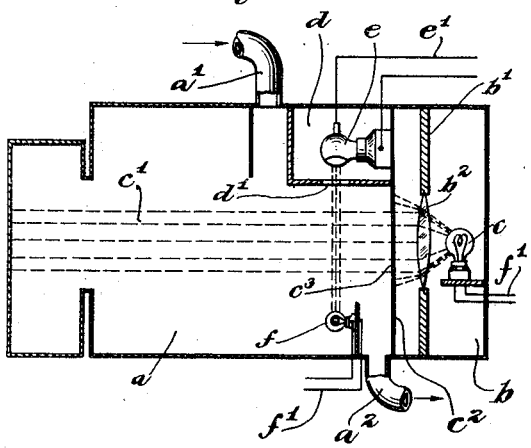
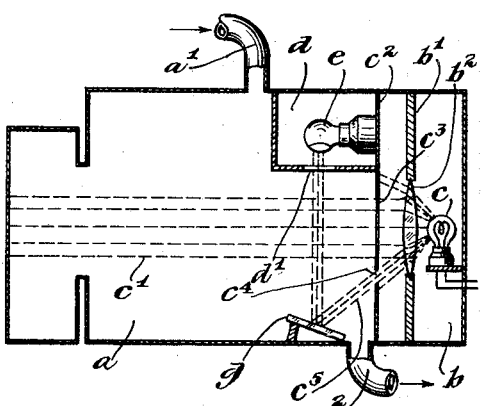
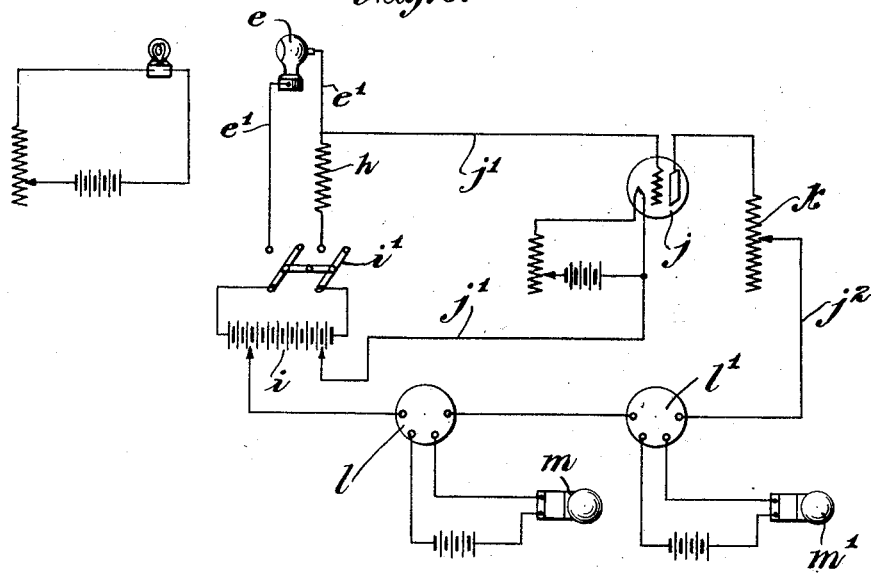
INVENTOR
Gustav George Freygang
BY
Redding, Greeley, O'Shea & Campbell
ATTORNEYS Patented Oct. 27, 1931

1,828,894

UNITED STATES PATENT OFFICE

GUSTAV GEORGE FREYGANG, OF WEEHAWKEN, NEW JERSEY, ASSIGNOR TO WALTER KIDDE & COMPANY, INC., OF NEW YORK, N. Y., A CORPORATION OF NEW YORK

SUPERVISORY SYSTEM FOR DETECTING SUSPENDED MATTER IN FLUIDS

Application filed October 30, 1928. Serial No. 316,095.

The present invention relates to the detection of the presence of suspended matter in fluids and is embodied in an improved device which is not only capable of detecting the presence of such bodies but is also constructed to indicate the existence of any irregularity in the system which would cause it to fail to operate.

In the copending application of Walter H. Freygang, Serial No. 116,522 filed June 17, 1926, there is disclosed a device for detecting the presence of suspended matter in fluids by means of the reflection of light from such suspended matter upon a light-sensitive or photo-electric cell. The cell is normally unilluminated and a beam of light from a pilot lamp passes through a detecting chamber in such manner that its rays do not fall upon the light-sensitive cell. If the fluid in the detecting chamber contains suspended matter, the beam of light strikes such matter and the light rays reflected therefrom fall upon the light-sensitive cell to indicate such condition. The present invention embodies the fundamental principles of the system disclosed in the foregoing application, and additionally provides a means for maintaining a supervisory current in the main alarm circuit by means of a supervisory light which is caused to fall upon the light-sensitive cell. The supervisory current is of insufficient magnitude to operate the main alarm signal, and hence the main alarm circuit is in a nonsignaling condition. Should the detecting apparatus become inoperative, or some reason exist for causing it to fail to operate, as by a wire break, the failure of any of the essential parts of the apparatus or the failure of the supervisory light itself, the supervisory current will be interrupted. The interruption of the supervisory current can be utilized for indicating the existence of such inoperative condition in order that it may be overcome.

Further features of the invention will appear as it is described more fully in connection with the accompanying drawings, wherein:

Figure 1 is a view in section through a proposed form of detecting chamber showing the detecting apparatus mounted to indicate the desired conditions.

Figure 2 is a view similar to Figure 1, showing a slightly modified construction.

Figure 3 is a diagrammatic representation of a suitable arrangement of photo-electric cell, amplifier, alarms and relays.

Referring to the drawings, $a$ designates a detecting chamber into which a fluid stream may be introduced at $a'$. This fluid stream may constitute air from a compartment which is to be protected against fire, and the stream, upon the existence of fire within the area to be protected, will be laden with smoke particles which will be introduced into the detecting chamber $a$. The stream flows out of the detecting chamber at $a^2$ thus completing the circuit through such chamber.

A compartment $b$ is formed in the detecting chamber by means of a partition $b'$ within which is mounted a lens $b^2$. A slight source $c$ is mounted within the compartment $b$, preferably at the focal point of lens $b^2$, in order that parallel rays may be directed through the detecting chamber $a$. A portion of these rays constituting a suitable beam of light is indicated at $c'$ and a screen $c^2$ provided with an aperture $c^3$ is mounted in the detecting chamber to prevent the existence of diverging rays in the beam of light $c'$.

A second compartment $d$ is formed in or communicates with the detecting chamber and provided with a photo-electric cell $e$ connected in a suitable circuit, the wires of which are indicated at $e'$. An aperture $d'$ is formed in the compartment $d$ through which light rays reflected from smoke particles or other suspended matter pass.

The screen $c_2$ is provided with an additional aperture $c^4$ through which a beam of light $c^5$ from the light source $c$ may pass. This beam of light falls upon a mirror $g$ and is reflected through the aperture $d'$, thus falling upon the photo-electric cell $e$. In this construction, the supervisory light is the main light source $c$, and the system is of such character that any fault will be detected, whether in the light source or in the alarm circuit.

In the modified form shown in Figure 2, a supervisory light source f, comprising an auxiliary lamp, is mounted in the detecting chamber immediately below the aperture d' in order that rays of light therefrom may pass through such aperture and fall upon the photo-electric cell e. The lamp constituting this supervisory light source may be connected in a suitable circuit, the wires of which are indicated at f'.

Figure 3 indicates, diagrammatically, a suitable electric alarm circuit. The photo-electric cell e is connected through wires e' with a resistance h and battery i. Switch i'' permits the system to be rendered operative or inoperative at will. A thermionic tube j receives its input current through wires j' which are mounted across the resistance h. The plate circuit of the thermionic tube includes a variable resistance k, battery i, no-load relay l and overload relay l'. Wire $j^2$ connects these elements in operative relation with the thermionic tube. Suitable alarms m and m' are operated by the respective relays l and l' to indicate the existence of a faulty condition, or the presence of smoke, respectively.

In the construction shown in Figure 1, the light from the mirror g is continually directed upon the photo-electric cell to reduce the resistance thereof sufficiently to cause a predetermined current flow through the circuit formed by the wire $j^2$. This current flow is insufficient to cause overload relay l' to function and sufficient to hold no-load relay l from operating. Should the apparatus become inoperative, the flow of the supervisory current will cease and no-load relay l will function. Should the fluid stream be laden with smoke particles, the resistance of the photo-electric cell will be further decreased by reason of the added light intensity falling thereon from the reflection and refraction of light by the smoke particles. This causes an increase of current in the circuit formed by the wire $j^2$ to cause the overload relay l' to function, thus sounding the appropriate alarm.

In the form shown in Figure 2, the operation described above takes place, the only difference being that the supervisory light source is an auxiliary lamp.

It will be seen that the system described above operates upon the principle of fluctuating currents, the polarities or relative directions of flow of several currents having no vital effect upon the system. The device is highly effective in operation, not only detecting the minutest presence of smoke, but also instantaneously indicating the existence of trouble in the apparatus itself in order that it may be repaired in good season.

I claim as my invention:

1. The method of detecting suspended matter in fluids which consists in causing light rays to fall upon a photo-electric element directly and continually to produce a normal condition, directing light by reflection and refraction from the suspended matter upon the element to cause an abnormal and changed condition, and causing a changed condition to produce an alarm signal.

2. The method of detecting suspended matter in fluids which consists in causing light rays to fall upon a photo-electric element directly and continually to produce a normal condition, providing a beam of light, directing the fluid stream to cause light from the beam to be reflected and refracted upon the element to cause an abnormal and changed condition, and causing a changed condition to produce an alarm signal.

3. The method of detecting suspended matter in fluids which consists in causing light rays to fall directly upon a photo-electric element to produce a normal current flow, causing the normal current flow to energize an alarm circuit, causing additional light rays to fall upon a photo-electric element by reflection and refraction to cause an abnormal current flow and causing the abnormal current to energize the alarm circuit to produce an alarm signal due to the additional light rays.

4. Means for detecting the presence of suspended matter in fluids comprising a photo-electric element, means to direct light rays upon the element, a light source, means to direct the fluid stream in the path of light from the light source to cause light to be reflected and refracted upon the photo-electric element, an alarm control circuit, alarm operating means in the circuit responsive to increases and decreases of current therein whereby the variations of light from the source and directing means produce fluctuations in the current in the alarm control circuit.

5. Means for detecting the presence of suspended matter in fluids comprising a photo-electric element, a circuit including the photo-electric element, a primary source of light, means to cause light from said primary source to fall upon the photo-electric element and thereby produce a normal current flow in said circuit, a second source of light, means to direct the fluid stream in the path of light from the last named source and thereby to cause light to be reflected and refracted upon the photo-electric element, means responsive to an increase of current in said circuit, and means in said circuit responsive to a decrease in the current therein.

6. Means for detecting the presence of suspended matter in fluids comprising a photo-electric element, means to direct light rays normally upon the element to maintain a normal resistance value thereof, an alarm control circuit connected to the element through which a supervisory current normally flows due to the resistance of the element, a light source, means to conduct the fluid in a path to cause the suspended matter carried thereby to reflect and refract light upon the photo-electric element to increase the current in the circuit, and an alarm operating means in the alarm control circuit responsive to increases and decreases of current therein.

This specification signed this 11th day of October A. D. 1928.

GUSTAV G. FREYGANG.